July 6, 1965
SVEN-OLOF KRONOGÅRD
3,192,719
HYDRODYNAMIC TORQUE CONVERTER
Filed March 27, 1962
6 Sheets-Sheet 1
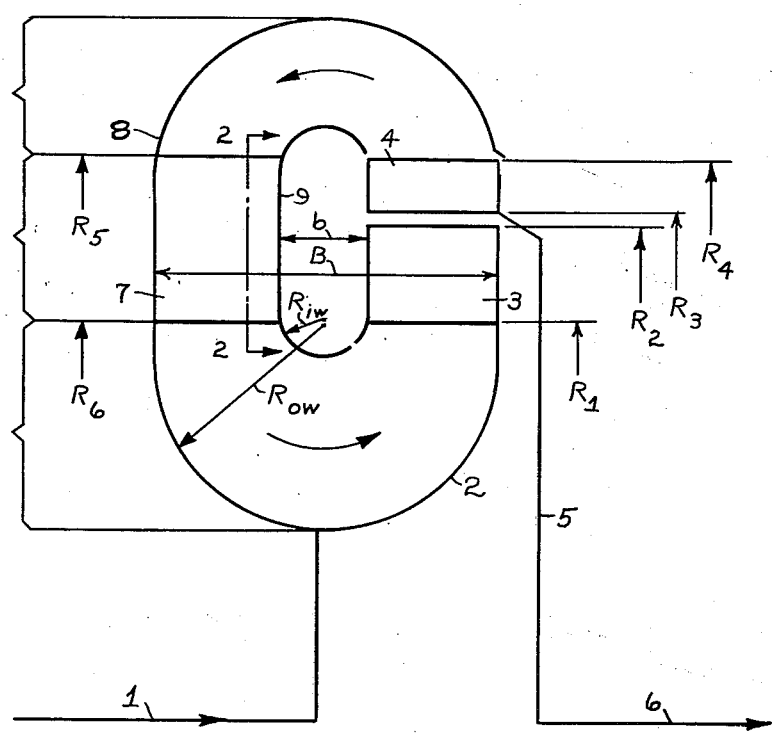
Fig. 1.
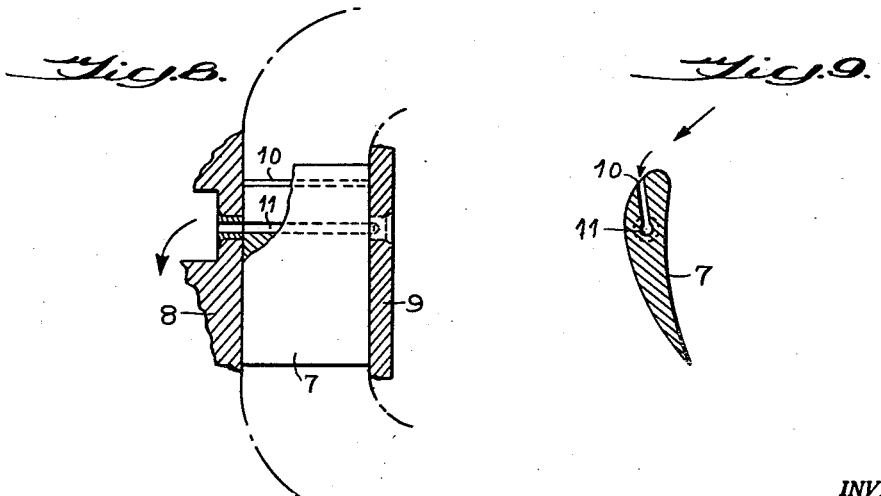
Fig. 8.
Fig. 9.
INVENTOR.
Sven-Olof Kronogård
BY
Pierce, Schiffler & Parker
ATTORNEYS INVENTOR.
Sven-Olof Kronogård INVENTOR.
Sven-Olof Kronogård
BY
Pierce, Scheffler & Parker
ATTORNEYS INVENTOR.
Sven-Olof Kronogård

United States Patent Office 3,192,719
Patented July 6, 1965

3,192,719
HYDRODYNAMIC TORQUE CONVERTER
Sven-Olof Kronogård, Gothenburg, Sweden, assignor to Aktiebolaget Volvo, Gothenburg, Sweden, a corporation of Sweden
Filed Mar. 27, 1962, Ser. No. 182,769
Claims priority, application Sweden, Nov. 8, 1955, 10,049/55
4 Claims. (Cl. 60—54)

This invention relates to hydrodynamic torque converters of the three-element type comprising a pump element, a turbine element and a reactor element enclosed within a housing, these elements forming a closed toroidal circuit in which fluid is circulated, and the present application is a continuation-in-part of my co-pending application Serial No. 620,744, filed November 6, 1956, now abandoned. The circuit has substantially two sections with radial and parallel inner and outer walls between which the pump element and the turbine element are located in the radially outflow section and the reactor element in the radially inflow section, the radial sections being interconnected by means of outer and inner bend sections which do not have any blading.

This invention is particularly directed to an improvement in the reactor element, as well as the circuit configuration, especially with respect to the bends leading to and from the reactor element, and has for its main purpose to increase to a substantial degree the stall torque ratio as well as the efficiency over the whole working range, particularly at low and also at high speed ratios.

For several applications, it is most essential to obtain continuous power flow and smooth operation over a very wide range of torque multiplication and speed ratios. For such applications, it has previously been necessary to use either presently available simple low torque multiplication, single stage torque converters combined with more complex, bulky and expensive mechanical transmissions usually designed for automatic power shift or, for example, a better but much more complex and expensive, six-element converter of the three stage type.

The general object of the present invention is to provide an improved, simple, single stage three-element torque converter which, besides using half the number of expensive bladed elements, gives substantially improved efficiency over the whole operating range and stall torque ratios up to a range of from 8:1 to 10:1.

This objective is mainly obtained by a novel arrangement and configuration of the reactor blading and circuit flow area which permits high velocity flow circulation of the fluid at small outlet angles from the preceding turbine element, wherein the inlet portions of the reactor blade element are configured in the likeness of a series of nozzles with a high degree of contraction and leading to individual channels between adjacent blades having substantially constant flow area and a length of from 1.6 to 2.5, and preferably 2.3, times the outlet path of the channels or blades. Thus, separation of fluid flow is avoided just at the very inlet to the reactor blading even at very small, and also very large, inlet angles.

It has been found that with ordinary types of blading of the reaction type, even with well rounded and blunt nose design, the desired performance cannot be obtained. The reactor element, in accordance with the invention, shall for low discharge angles at standstill of the turbine be designed to give a throat area of less than 0.60, and preferably 0.55 of the pitch, i.e. the distance between corresponding points on the inlet edges of adjacent reactor blades, and this throat area shall be located at a point not more than 0.35, and preferably 0.25, of the radial distance between the inlet and outlet edges of the reactor blades as measured from the inlet edges.

A further improvement, permitting high fluid circulation and high turbine outlet flow is obtained by the fluid circuit arrangement in which a contraction of from 5 to 20%, preferably about 10%, is established in the outer bend and provides more even circulation velocity and reduced eddying from the turbine as well as avoiding separation due to the centrifugal pressure gradient. The high peripheral as well as the circulation velocity at the outer bend, especially at stall, would cause separation. The inner bend where centripetal force from the circulating fluid is partly eliminated due to the centrifugal force from the peripheral velocity set up by the reactor element is made with from 0 to 10%, and preferably about 5%, area increase while the turbine which has an accelerated flow and no separation risk, is made with remaining area increase corresponding to from 5 to 20%, and preferably 15%.

A further improvement in the result is obtained in accordance with the invention when, in addition to the above flow area relationship, the reactor blading is twisted in such a way that, in the direction of rotation, the end of the outlet edge adjacent the outer wall of the housing leads the opposite end of the outlet edge adjacent the inner wall of the housing. This twisting, as well as the contraction for the inlets to the channels between adjacent blades of the reactor element earlier mentioned, has a considerable effect on this particular type of fluid circuit at small radius ratios of bend radii for inner and outer walls $R_{iw}/R_{ow}$, i.e. small core ratios $b/B$, depending upon the extreme high velocities along the core where thus the flow is circulating. The twisting unloads the inner portion of the reactor and pump blading, thus increasing efficiency and flow.

A further improvement in the result is obtained in accordance with the invention when, in addition to the above flow area relationship and twisting, the reactor blading includes boundary layer control to minimize creation, or to remove undesirable build-up, of boundary layer between reactor blades and along the circuit core, especially at low and high speed ratios between the turbine and pump and in which the fluid entrance angle to the reactor blading is at corresponding minimums. This boundary layer control is effected by slots in the blading extending substantially parallel with and adjacent the inlet edges of the reactor blading and by seal clearances between the core members communicating with a channel leading through the blades and the inner and outer walls of the housing.

For applications of the invention which require a variable engine speed, e.g., increasing engine speed with increasing turbine speed at constant throttle setting, a still further improvement is attained by making the reactor blades adjustable about an axis parallel to the axis of rotation of the converter to alter the torque absorption of the pump and thus the speed, power and fuel consumption of the complete power pack according to the requirements. The effect of the adjustable blading is favorable with this particular three-element type of circuit and reaction blading for several reasons, among others, because of the fact that there is a negligible change in efficiency over a wide torque range due to the earlier described type of reactor blading.

Other objects and advantages of the invention and the manner in which they are best attained will appear from the following description in connection with the drawings forming a part of the specification, by way of example but without limitation, for a hydrodynamic torque converter illustrating the principles of the invention, and in which:

FIG. 1 is a section view of a fluid flow circuit diagram embodying the invention;

FIGS. 8 and 9 illustrate a still further modification of the reactor blading wherein provision is made for boundary layer control of reactor blading and fluid circuit;

Figure 10:
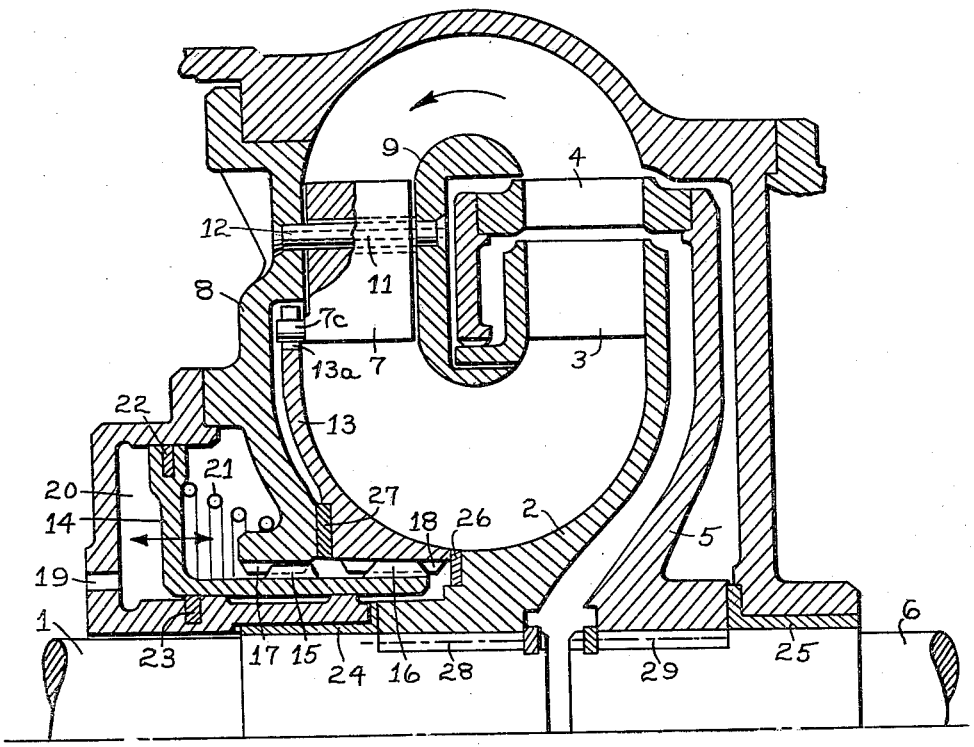
FIGS. 10 and 11 illustrate a further modification wherein provision is made for angular adjustment of the reactor blading.

With reference now to the drawings and in particular to FIG. 1 and also FIG. 10, there is illustrated a three-element single stage torque converter according to the invention. Here reference numeral 1 designates an input shaft driven by a prime mover, not shown, and attached to shaft 1 is a pump member 2 provided with a rim of pump blades 3 located in the outward radial flow portion of the toroidal circuit. Radially outside the pump blade rim is a rim of turbine blades 4 carried by a disc 5 attached to an output shaft 6. In the inward radial flow portion of the toroidal circuit there is provided a rim of reactor blades 7 secured to housing 8 which is stationary.

The outer and inner axial flow, or bend portions of the toroidal circuit interconnecting the radial flow portions are unbladed.

When input shaft 1 is rotated, the working fluid contained in the chamber formed by the outer and inner shells of the pump, turbine and reactor elements is circulated in the closed toroidal path in the direction indicated by arrows in FIG. 1, thereby transmitting power from the pump 2 to the turbine 4, 5 for rotating the output shaft 6.

Figure 2:
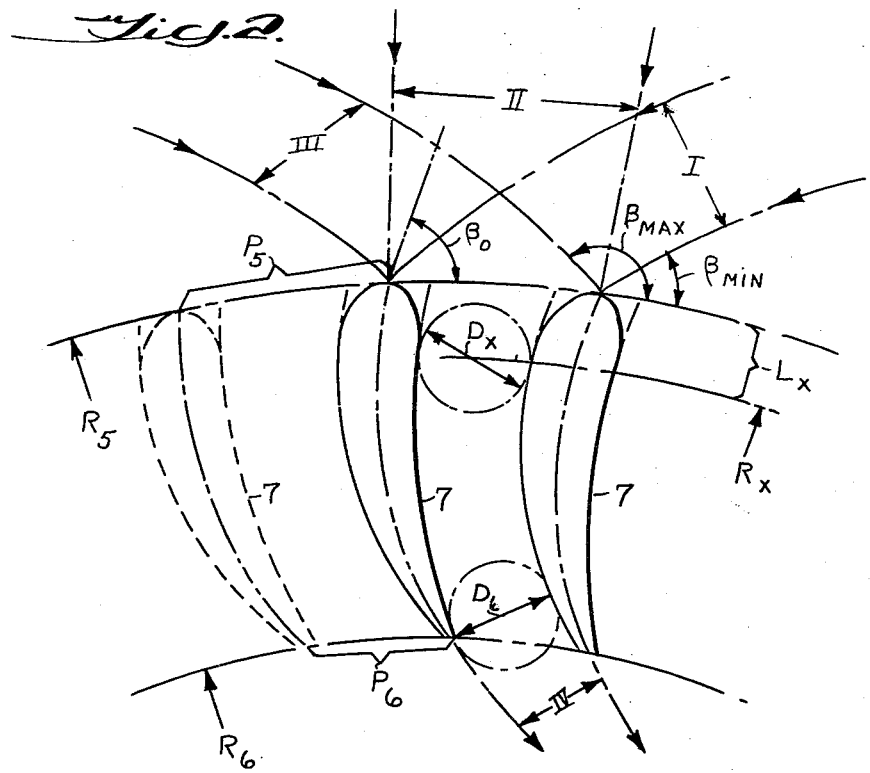
FIG. 2 is a fragmentary view of the reactor member showing a portion of the reactor blading, as seen along section line 2—2 of FIG. 1.

FIG. 2 is a radial section showing a fragmentary view of the reactor element in which some of the reactor blades 7 are illustrated. In this view, numerals I, II and III designate the flow discharged from the preceding turbine blading 4 and striking the inlet of the reactor blading 7 over an extremely wide range of inlet angles $\beta$ varying between $\beta_{min}$ at stall, i.e. at zero speed and maximum torque of the turbine element, and $\beta_{max}$ at racing speed, i.e. at maximum speed and zero torque of the turbine element. The angle $\beta$ is here defined as the angle between the fluid flow and the tangent to the circle defining the inlet, or outlet, of any of the blades 7. Angle $\beta_o$ refers to the reactor blading 7 and is defined as the angle between a tangent to the camber line of the reactor blade 7 and the tangent of the circle defining the inlet of the reactor blade, both tangents being located at the inlet point of the camber line. When the entering fluid strikes the inlet to the reactor blading with an angle equal to $\beta_o$, this corresponds to the most ideal inlet condition from an angle point of view.

Furthermore, in FIG. 2, the outlet flow of fluid from the reactor blading 7 is designated with numeral IV. Inlet and outlet radii of the reactor are designated by $R_5$ and $R_6$, respectively, the corresponding pitch values by $P_5$ and $P_6$ respectively, and finally the throat measure between adjacent rector blades 7 by $D_6$ at the oulet and by $D_x$ at a radius of $R_x$ corresponding to a distance of $L_x$ as measured from a circle of radius $R_5$ defining the inlet of the reactor blading.

Figure 3:
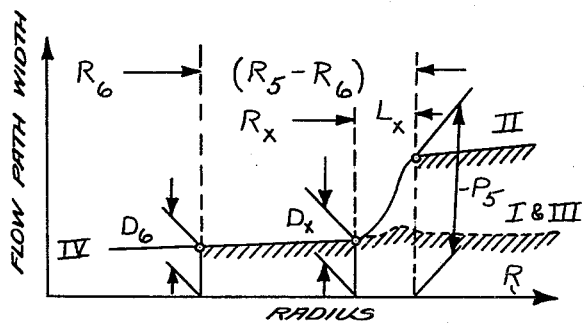
FIGS. 3 and 3a are circuit area diagrams for the reactor and for the complete circuit, respectively.

FIG. 3 illustrates the width of the fluid flow passing through the blading 7 of the reactor element which has a radial length or extension equal to $R_5-R_6$ and a flow path width of $D_6$ and $D_x$ at the outlet and inlet respectively to the throat. These measurements are fixed and defined by the reactor blading. The width of the flow path just before the entrance to the reactor blading varies with the entrance angle $\beta$ between a maximum of $P_5$ corresponding to entrance in a radial direction, in which case angle $\beta=90°$, and designated by II, and extreme low values corresponding to $\beta_{min}$ and $\beta_{max}$ and which are designated by I and III, respectively.

In accordance with the invention, the fluid entrance between each pair of adjacent blades 7 of the reactor element is contracted in the manner of a nozzle, the ratio of the radial distance between the outer and inner circles $R_5$ and $R_6$ previously mentioned in connection with FIG. 2 and which are tangent respectively to the inlet and outlet edges of the blades 7, to the pitch distance $P_6$ between corresponding outlet edges of adjacent blades 7 lies within the limits of 1.6 to 2.5, and preferably 2.3. Moreover, the distance $D_x$ between surfaces of adjacent blades 7 at a distance $L_x$ located not more than .35, and preferably .25 of the radial distance between $R_5$ and $R_6$ as measured from $R_5$ is less than .60, and preferably .55, of the pitch distance $P_5$ between corresponding points on the inlet edges of adjacent blades 7.

Figure 3A:
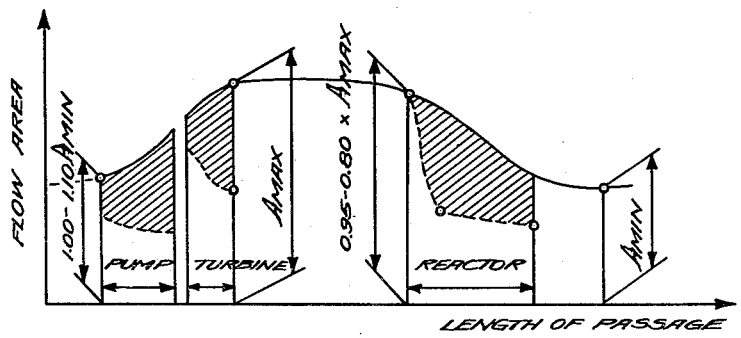

FIG. 3a shows a complete diagram over the circuit flow area through the two radial sections containing the outward flow pump and turbine and the inward flow reactor as well as through the interconnecting bends. Here the full line shows the area in the circuit as if it were bladeless throughout and measured perpendicular to the circulating flow component in the radial section. This flow area is plotted as a function of the length of the center stream line in the circuit defined by the centers of circles being tangential to the outer and inner walls of the circuit starting at the inlet to the pump. On this diagram is marked the minimum and maximum areas of this particular circuit according to the invention and which are located respectively in the inner bend just ahead of the pump and at the outer bend just after the turbine, the area increase being in the range of from 0 to 10% in the later portion of the inner bend and the contraction in the range of from 5 to 20% in the outer bend.

In FIG. 3a is further shown the effect on the channel area by the blade elements for the pump, turbine and reactor, and where the pronounced contraction in the reactor blading according to the invention can be seen in relation to flow area in other elements of this particular unit.

Figure 4:
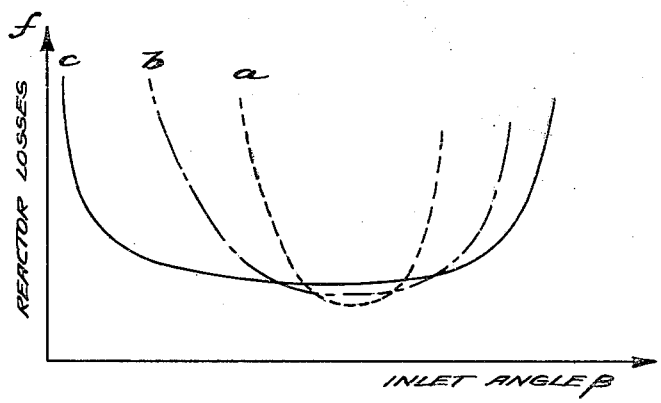
FIG. 4 is a diagram for this particular type of fluid circuit showing flow losses for various known designs of reactor elements in comparison with the losses pertaining to a reactor element in accordance with the invention.

FIG. 4 illustrates the flow losses in the reactor as a function of the inlet angle to this element, this inlet angle being substantially the same as the discharge angle of the preceding turbine element. Here, curve (a) shows the losses with a thin profile type of reactor blade made of sheet metal and (b) shows the losses with a standard airfoil type of blade designed for reaction and having a well rounded and blunt nose. The loss curve of the reactor blading according to the present invention is illustrated by curve (c) and shows an extremely broad operating range at low loss factor due to the previously described configuration of reactor blade element which establishes a high degree of contraction in the entry between adjacent blades. As contrasted with curve (c), curves (a) and (b) show a low loss factor only within a very narrow range of inlet angle to the reactor blading.

Figure 5:
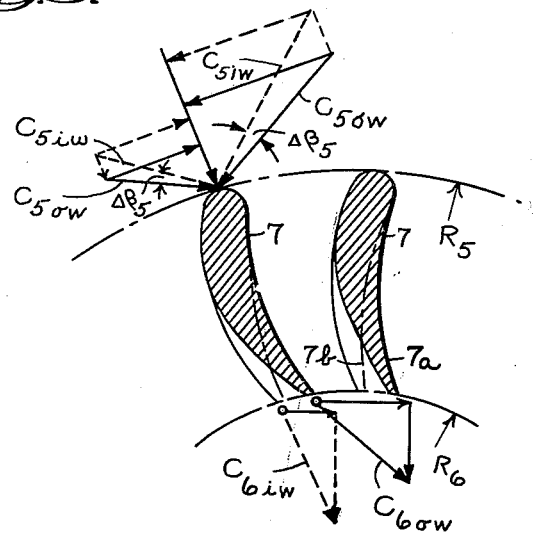
FIG. 5 illustrates a modified construction for the reactor element wherein the blading is twisted.

FIG. 5 shows the inlet and outlet conditions of a reactor blading according to the invention and which is twisted in such a manner that the outlet edge portion 7a of the blade 7 which is hatched and which is adjacent to the outer wall 8 of the housing, this wall being shown in FIG. 10, leads over the outlet edge portion 7b which is adjacent the inner wall 9 of the housing as measured in the direction rotation, thus creating a greater whirl in the direction of the pump rotation $\omega_p$ and thus compensating for the effect of higher radial velocity at the inner wall of the pump and gives a constant inlet angle over the whole pump entrance, and thus reducing shock losses and increasing the efficiency, flow and torque ratio. The twisting of the reactor blading becomes more important the higher the flow and the smaller the ratio of $R_{iw}/R_{ow}$ or which is the same, the smaller the ratio $b/B$.

For FIG. 5, $C_{5iw}$ and $C_{5ow}$ designate the inlet velocities at the inner wall ($iw$) and the outer wall ($ow$), respectively of the reactor element while $\Delta\beta_5$ shows the difference between inlet angles at the inner and outer walls of the reactor due to the higher radial circulation velocity along the inner wall of the circuit. The inlet conditions are illustrated both for low and high speed ratios. As can be seen, the increased flow at the inner wall in conjunction with the twisted blade in this particular unit tends to reduce the turning angle and thus the load of the reactor blade element thus further increasing the flow in this region with a further increase in efficiency as the result.

Figure 6:
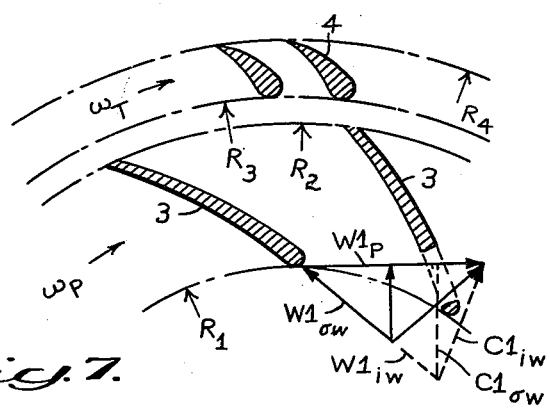
FIGS. 6 and 7 are views illustrating the effect of blade twist on inlet flow to the pump blading.

FIG. 6 shows the effect of the twisted reactor blading on the pump inlet conditions, resulting in constant angle over the whole pump entrance, permitting this member to operate under optimum conditions with increased flow and efficiency as a result. In this figure, the pump blades and turbine blades are indicated at 3 and 4 respectively. The inlet and outlet radii of the pump are indicated respectively by $R_1$ and $R_2$. The inlet and outlet radii of the turbine are indicated respectively by $R_3$ and $R_4$. $\omega_P$ and $\omega_T$ designate respectively the angular velocities of the pump and turbine elements. The velocity diagrams $C1_{iw}$ and $C1_{ow}$ the absolute velocities at the inner and outer walls of the pump inlet and are approximately the same as the corresponding velocities at the reactor outlet. Further $W1_{iw}$ and $W1_{ow}$ designate the relative velocities at the inner and outer wall entrance of the pump, and $W1_P$ designates the peripheral velocity of the inlet edges of the pump blades.

Figure 7:
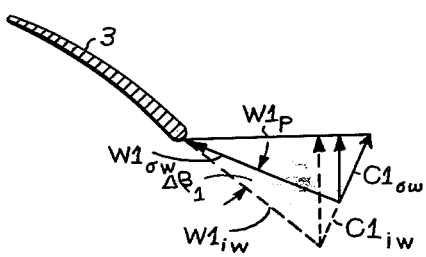

FIG. 7 shows the entrance conditions at the pump without a twisted blade reactor. The speed designations are the same as for FIG. 6 and $\Delta\beta_1$ is the difference in inlet angle between the inner and outer walls, and which will at extreme high flow conditions corresponding to very low values of $b/B$, e.g., less than .3 affect the efficiency in an adverse manner and can be compensated for by blade twisting, preferably in the reactor, as has been explained.

FIGS. 8 and 9 show boundary layer control to be applied to the reactor and circuit in that fluid, e.g. the fluid circulation needed anyhow for cooling, is taken through a slot 10 in each blade 7 extending parallel with and adjacent the inlet edge of the blade, this slot 10 communicating with a channel 11 which extends through the blade parallel to slot 10 and also through the outer and inner walls 8 and 9 of the housing. The slots 10 thus eliminate the possibility of building up boundary layer in zones where deceleration occurs after a local high velocity zone with sharp deflection such as on the low pressure side of the reactor element or the core 9 of the torus.

Boundary layer control on this particular unit in accordance with the invention, with or without twisting of the reactor blades has for its object to permit the extremely high flow which is theoretically possible with this particular type of unit if boundary layer build-up in decelerating zones can be avoided, as tests have indicated. This opens great and unequalled possibilities for improvement in this particular design as compared to other medium or low flow units which show little or no gain by boundary layer control. Furthermore, boundary layer control can here be arranged very easily and inexpensively because of the extreme thickness and special configuration of the reactor blading and further because of the fact that the reactor blading is attached directly to the stationary housing 8 and stationary inner core 9 thus making possible an extremely practical arrangement for removal of the boundary layer flow.

Figure 11:
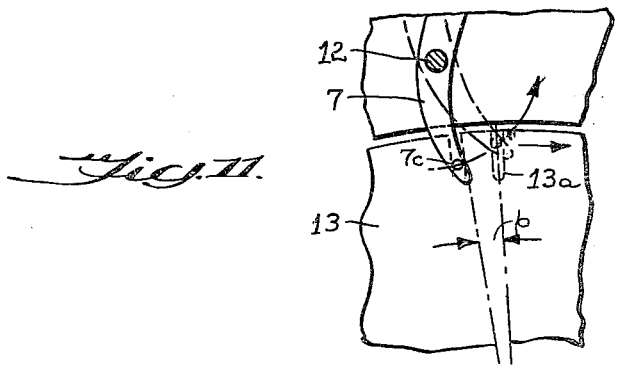

FIGS. 10 and 11 illustrate an arrangement for adjusting the reactor blading. To this end, the reactor blades 7 are mounted for pivotal movement on shafts 12 riveted or otherwise fixed to the stationary housing and core members 8 and 9 respectively. The reactor blades 7 are provided with studs 7c which fit into essentially radially extending slots 13a in a disc 13 which can be turned about its center of rotation by means of a servo piston 14 which is provided with two sets of splines 15 and 16 mating with corresponding sets of splines 17 in the converter housing and splines 18 in the rotatable slotted disc 13, one set of these splines being of the spiral type and the other set being of the straight type, thus resulting in a turning action of slotted disc 13 and hence, also of the reactor blades 7 as piston 14 is moved in an axial direction. Piston 14 can be actuated by hydraulic pressure fluid which enters through a passage 19 leading into a cylinder 20 at one side of the piston, a return spring 21 being located at the opposite side of piston 14. If desired, the hydraulic cylinder can be of the double-acting type as distinguished from the single-acting unit depicted. Other detail elements shown in FIGS. 10 and 11 are the piston seals 22 and 23, bearings 24, 25 and thrust washers 26, 27 and splines 28 and 29 for securing the pump and turbine elements to their respective driving and driven shafts 1 and 6.

The pivot shafts 12 for the reactor blades 7 may be made hollow, as shown, so as to make provision for the passageways 11 therein for removal of boundary layer.

Figure 12:
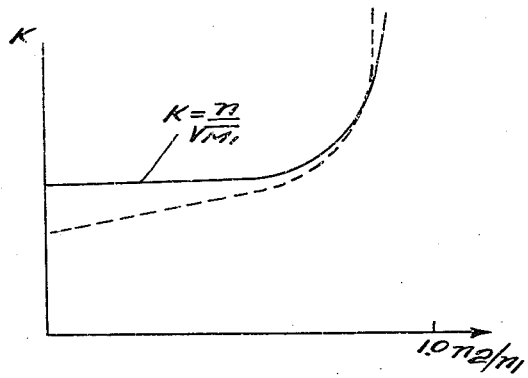
FIGS. 12, 13 and 14 are curves in explanation of the effect of adjustable reactor blading on this particular type of circuit.

FIG. 12 shows how the K-factor, which is the same as the input speed for a constant torque engine, e.g. a diesel engine, can be given any desired shape, according to the requirements and the working cycle. The solid line in FIG. 12 shows a more constant torque curve over most of the torque range and the dashed line shows a rising input speed curve which is often desirable in applications of the torque converter to vehicles. The desired torque characteristics can be selected manually or automatically.

Figure 13:
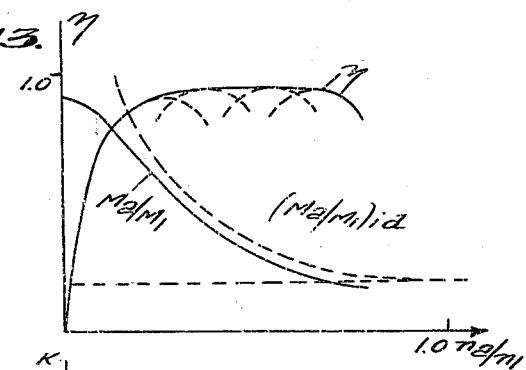
Figure 14:
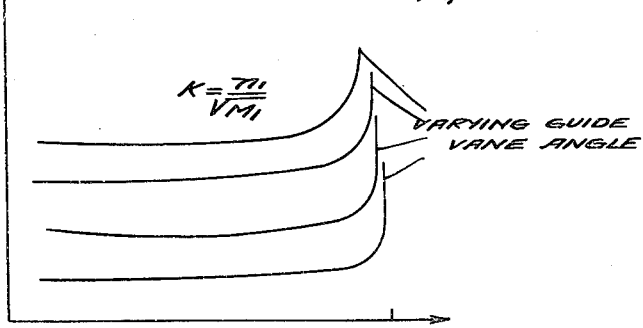

For similar applications where a rising torque curve and high torque multiplication is desirable, one has hitherto utilized more complicated and expensive five or six element type torque converters whereas with a construction in accordance with the present invention, it is possible to obtain better efficiency, increased torque multiplication and improved control with a comparatively simple design. FIGS. 13 and 14 further illustrate the efficiency and torque ratio and absorbed torque with a construction according to the invention. In FIG. 14 is further shown how the torque absorption at a given speed ratio, in the illustrated example at $n_2/n_1=1.0$, can be completely shut off manually or automatically, which is sometimes of great importance, e.g. in earth moving and other similar equipment where instantaneous and complete control of power is desirable.

I claim:

1. In a hydrodynamic torque converter of the three-element type comprising a housing, a bladed pump element, a bladed turbine element and a bladed reactor element, said housing and said three elements forming a closed toroidal circuit established between inner and outer walls in which fluid is circulated, said circuit having substantially radial and parallel wall portions establishing radial inflow and radial outflow sections connected together by inner and outer bladeless bend sections, said pump and turbine elements being located in said radial outflow section and said reactor element being located in said radial inflow section, a driving element connected to said pump element and a driven element connected to said turbine element, the improvement wherein the ratio of the radial distance between outer and inner circles tangent respectively to the inlet and outlet edges of the blades of said reactor element to the distance between corresponding points on the outlet edges of adjacent reactor blades lies within the limits of 1.6 to 2.5, and the distance between surfaces of adjacent blades of said reactor element at a point located between .25 and .35 of the radial distance between said outer and inner circles as measured from said outer circle is substantially .55 of the distance between corresponding points on the inlet edges of adjacent blades of said reactor element but larger than the throat measurement between adjacent reactor blades at the outlet.

2. A hydrodynamic torque converter as defined in claim 1 wherein the outer bend section between the turbine outlet and the reactor inlet of said closed toroidal circuit has a gradually increasing contraction in the direction of the inlet to said reactor element, the contraction factor being in the range of from 5–20%.

3. A hydrodynamic torque converter as defined in claim claim 1, wherein the outer bend section between the turbine outlet and the reactor inlet has a gradually increasing contraction of said closed toroidal circuit in the direction of the inlet to said reactor element, the contraction factor being about 10%.

4. A hydrodynamic torque converter of the three element type comprising a housing, a bladed pump element, a bladed turbine element and a bladed reactor element, said housing and said three elements forming a closed toroidal circuit established between inner and outer walls in which fluid is circulated, said circuit having substantially radial and parallel wall portions establishing radial inflow and radial outflow sections connected together by inner and outer bladeless bend sections, said pump and turbine elements being located in said radial outflow section and said reactor element being located in said radial inflow sections, the surface of each said reactor blade being provided with an intake slot for fluid discharged from the fluid circuit extending substantially parallel with and adjacent the inlet edge of said blade, said slot communicating with a channel extending through said blade and also through said inner and outer walls of said housing for draining fluid from said circuit to be cooled, a driving element connected to said pump element and a driven element connected to said turbine element, the ratio of the radial distances between outer and inner circles tangent respectively to the inlet and outlet edges of the blades of said reactor element to the distance between corresponding points on the outlet edges of adjacent reactor blades being within the limits of 1.6 to 2.5 and the distance between surfaces of adjacent blades of said reactor element at a point located between .25 and .35 of the radial distance between said outer and inner circles as measured from said outer circle being substantially .55 of the distance between corresponding points on the inlet edges of adjacent blades of said reactor element.

References Cited by the Examiner
UNITED STATES PATENTS

| | | | |
|---|---|---|---|
| 2,292,384 | 8/42 | Lysholm | 60—54 |
| 2,585,851 | 2/52 | Salerni | 60—54 |
| 2,678,537 | 5/54 | Stalker | 60—54 |
| 2,690,053 | 9/54 | Ahlen | 60—54 |
| 3,016,709 | 1/62 | Lysholm | 60—54 |

FOREIGN PATENTS 874,545  4/53  Germany.

JULIUS E. WEST, *Primary Examiner.*
EDGAR W. GEOGHEGAN, *Examiner.*